United States Patent
Andrews et al.

(10) Patent No.: US 12,505,906 B2
(45) Date of Patent: Dec. 23, 2025

(54) METHODS AND APPARATUS FOR DETERMINING DEVICE DOSAGE

(71) Applicant: Eli Lilly and Company, Indianapolis, IN (US)

(72) Inventors: Jeffrey Sterling Andrews, Carmel, IN (US); Xuanyao He, Belmont, MA (US); Jie Xue, Zionsville, IN (US)

(73) Assignee: Eli Lilly and Company, Indianapolis, IN (US)

( * ) Notice: Subject to any disclaimer, the term of this patent is extended or adjusted under 35 U.S.C. 154(b) by 714 days.

(21) Appl. No.: 17/637,950

(22) PCT Filed: Aug. 25, 2020

(86) PCT No.: PCT/US2020/047742
§ 371 (c)(1),
(2) Date: Feb. 24, 2022

(87) PCT Pub. No.: WO2021/041378
PCT Pub. Date: Mar. 4, 2021

(65) Prior Publication Data
US 2022/0285003 A1    Sep. 8, 2022

Related U.S. Application Data

(60) Provisional application No. 62/894,477, filed on Aug. 30, 2019.

(51) Int. Cl.
G16H 20/17    (2018.01)
G16H 40/67    (2018.01)

(52) U.S. Cl.
CPC .............. *G16H 20/17* (2018.01); *G16H 40/67* (2018.01)

(58) Field of Classification Search
CPC ................................................... G16H 20/17
See application file for complete search history.

(56) References Cited

U.S. PATENT DOCUMENTS 9,125,991 B2   9/2015   Schabbach et al.
9,672,328 B2   6/2017   Saint et al.
(Continued)

FOREIGN PATENT DOCUMENTS

WO   2011117212    9/2011
WO   2014161955    10/2014
(Continued)

OTHER PUBLICATIONS

Poudel RS, Shrestha S, Bhandari S, Piryani RM, Adhikari S. Diabetes Mellitus with Poor Glycemic Control as a Consequence of Inappropriate Injection Technique. Case Rep Endocrinol. Apr. 1, 2018;2018:7236452. doi: 10.1155/2018/7236452. PMID: 29805817; PMCID: PMC589986 (Year: 2018).*
(Continued)

*Primary Examiner* — Joseph D Burgess
(74) *Attorney, Agent, or Firm* — Arthur Shum

(57) ABSTRACT

The techniques described herein relate to computerized methods and apparatus for determining a dose injected into a user by one or more medication delivery devices. Data is accessed that is indicative of an injection event group that includes one or more injection events associated with one or more medication delivery devices. The injection event group is processed to determine the dose injected into the user based on one or more of whether the injection event is associated with a medication delivery device change, a dose size of one or more of the injection events, a position of one or more of the injection events in the injection event group, and/or a time period between one or more injection events to a next injection event in the injection event group.

14 Claims, 13 Drawing Sheets

(56) References Cited

U.S. PATENT DOCUMENTS

| | | |
|---|---|---|
| 9,959,391 B2 | 5/2018 | Saint et al. |
| 10,391,235 B2 | 8/2019 | Schabbach et al. |
| 2010/0137791 A1* | 6/2010 | Plumptre .......... A61M 5/31555 604/68 |
| 2014/0005950 A1 | 1/2014 | Groeschke et al. |
| 2016/0012205 A1 | 1/2016 | Saint et al. |
| 2016/0030679 A1 | 2/2016 | Nielsen et al. |
| 2016/0235925 A1 | 8/2016 | Kuhn et al. |
| 2017/0270276 A1* | 9/2017 | Saint ...................... G16H 20/13 |
| 2017/0312455 A1 | 11/2017 | Mirov et al. |
| 2019/0035500 A1 | 1/2019 | Saint et al. |
| 2021/0050085 A1* | 2/2021 | Hayter ................... G16H 10/60 |
| 2022/0208329 A1* | 6/2022 | Mensinger ............. G16H 20/13 |

FOREIGN PATENT DOCUMENTS

| | | |
|---|---|---|
| WO | 2015001008 | 1/2015 |
| WO | 2015185686 | 12/2015 |
| WO | 2016007935 | 1/2016 |
| WO | 2019057460 | 3/2019 |

OTHER PUBLICATIONS

Grenye, O., et al., "Trends in Insulin Pen Priming," Diabetes Jul. 1, 2018; 67 (Supplement_1): 83-LB.
Patent Cooperation Treaty International Search Report pertaining to International Application No. PCT/US2020/047742, International Filing Date: Aug. 25, 2020; Date of Mailing: Nov. 3, 2020.
Patent Cooperation Treaty Written Opinion of the International Searching Authority pertaining to Application No. PCT/US2020/047742, International Filing Date: Aug. 25, 2020; Date of Mailing: Nov. 3, 2020.

* cited by examiner

300 →

| Time | Dose (Units of insulin) | Group |
|---|---|---|
| 4:42:03 PM | 2 | 1 |
| 4:47:03 PM | | |

302 brackets the two time rows.

| Time | Dose (Units of insulin) | Group |
|---|---|---|
| 4:55:14 PM | 1 | 1 |
| 4:55:19 PM | 1 | 1 |
| 4:55:22 PM | 3 | 1 |
| 4:55:28 PM | 4 | 1 |
| 4:55:34 PM | 4 | 1 |
| 5:00:34 PM | | |

352, 354, 356, 358, 360 bracket successive time row pairs.

| Time | Dose (Units of insulin) | Label |
|---|---|---|
| 5:23:38 PM | 2 | Priming |
| 5:24:11 PM | 33 | Injection |

| Time | Dose (Units of insulin) | Label |
|---|---|---|
| 8:02:15 AM | 2 | Priming |
| 8:02:20 AM | 2 | Priming |
| 8:02:37 AM | 20 | Injection |

| Time | Dose (Units of insulin) | Label |
|---|---|---|
| 8:58:11 AM | 12 | Injection |
| 8:59:31 AM | 2 | Injection |

| Time | Dose (Units of insulin) | Change Time | Label |
|---|---|---|---|
| 4:55:14 PM | 1 | 4:54:56 PM | Priming |
| 4:55:19 PM | 1 | 4:54:56 PM | Priming |
| 4:55:22 PM | 3 | 4:54:56 PM | Priming |
| 4:55:28 PM | 4 | 4:54:56 PM | Priming |
| 4:55:34 PM | 4 | 4:54:56 PM | Injection |

| Time | Dose (Units of insulin) | Change Time | Label |
|---|---|---|---|
| 7:39:31 PM | 1 | 7:41:55 PM | Injection |
| 7:42:10 PM | 5 | 7:41:55 PM | Injection |

| Time | Dose (Units of insulin) | Time Gap (sec) | Label |
|---|---|---|---|
| 4:55:19 PM | 11 | 81 | Injection |
| 4:56:40 PM | 3 | 0 | Injection |

| Time | Dose (Units of insulin) | Time Gap (sec) | Label |
|---|---|---|---|
| 4:56:40 PM | 3 | 0 | Injection |

| Time | Dose (Units of insulin) | Time Gap (sec) | Label |
|---|---|---|---|
| 4:55:40 PM | 5 | 60 | Priming |
| 4:56:40 PM | 3 | 0 | Injection |

| Time | Dose (Units of insulin) | Time Gap (sec) | Time Gap Rank | Label |
|---|---|---|---|---|
| 4:55:14 PM | 1 | 5 | 3 | Priming |
| 4:55:19 PM | 1 | 3 | 2 | Priming |
| 4:55:34 PM | 4 | 0 | 1 | Injection |

| Time | Dose (Units of insulin) | Time Gap (sec) | Time Gap Rank | Label |
|---|---|---|---|---|
| 4:55:14 PM | 1 | 5 | 2 | Priming |
| 4:55:19 PM | 1 | 81 | 4 | Injection |
| 4:56:40 PM | 3 | 48 | 3 | Priming |
| 4:57:28 PM | 4 | 0 | 1 | Injection |

| Time | Dose (Units of insulin) | Time Gap (sec) | Time Gap Rank | Label |
|---|---|---|---|---|
| 4:55:19 PM | 1 | 81 | 2 | Priming |
| 4:56:40 PM | 3 | 0 | 1 | Injection |

FIG. 10C

METHODS AND APPARATUS FOR DETERMINING DEVICE DOSAGE

CROSS-REFERENCE TO RELATED APPLICATIONS

This application is a National Stage of International Application No. PCT/US2020/047742, filed Aug. 25, 2020, which claims priority to U.S. Provisional Application No. 62/894,477 filed Aug. 30, 2019, the entire disclosures of each of which are hereby expressly incorporated by reference herein.

BACKGROUND

Medication delivery devices include injection-type delivery devices that inject doses of medication. Multi-use injection devices often include a reservoir that holds the medication, and dose setting mechanism that allows the user to set a desired dose size for each injection. Insulin pens are an example of a multi-use injection devices. Insulin pens include a reservoir of insulin sufficient for multiple doses over an extended period of time, such as over a number of days or weeks. Insulin pens also allow a user to specifically dial the amount of units to deliver with each injection.

Patients that use medication delivery devices, such as insulin pens, often need to follow a prescribed a dosing schedule, which can include a number of injections throughout the course of each day, as well as the dose size for each injection. Patients must manually keep track of each injection and the dose size, which can be cumbersome, tedious, and prone to human error.

SUMMARY

The present disclosure relates to techniques for determining injection dose information. In some embodiments, the techniques can process multiple injection events to distinguish non-events (e.g., priming events) from actual injected doses. In some embodiments, the techniques can incorporate change information (e.g., a medication cartridge change and/or switching medication delivery devices) into the analysis in order to determine the injected dose in view of the change event.

Various aspects are described in this disclosure, which include, but are not limited to, the following aspects:

1. A computerized method for determining a dose injected into a user by one or more medication delivery devices, the method comprising: accessing data indicative of an injection event group comprising one or more injection events associated with one or more medication delivery devices, wherein each of the one or more medication delivery devices comprises: a dose adjustment mechanism that allows a user to adjust a dose amount for an injection of the medication delivery device, a reservoir sized sufficiently to hold medication for a plurality of doses, one or more sensors to detect an amount of dose dispensed for each injection, and a wireless communication unit that communicates amount of dose dispensed and time dispensed; determining whether the injection event group is associated with a medication delivery device change; upon determining the injection event group is not associated with the medication delivery device change, analyzing the injection event group based on a first dose detection algorithm to determine a dose administered to a user; and upon determining the injection event group is associated with the medication delivery device change, analyzing the injection event group based on a second dose detection algorithm to determine the dose administered to the user.

2. The computerized method of aspect 1, wherein: the one or more medication delivery devices comprises a previous medication delivery device and a new medication delivery device; and determining whether the injection event group is associated with the medication delivery device change comprises determining whether the user switched from using the previous medication delivery device to using the new medication delivery device within a predetermined time window of the injection event group.

3. The computerized method of aspect 1, wherein: the one or more medication delivery devices comprises one medication delivery device; and determining whether the injection event group is associated with the medication delivery device change comprises determining whether there is a change of a replaceable medication cartridge of the one medication delivery device within a predetermined time window of the injection event group.

4. The computerized method of aspect 1, wherein analyzing the injection event group based on the first dose detection algorithm comprises: determining a number of injection events in the injection event group is greater than two; and determining the dose is equal to an injected amount associated with a latest injection event of the injection event group, wherein the latest injection event occurred later in time than any other injection event in the injection event group.

5. The computerized method of aspect 4, wherein the latest injection event is designated a true injection event, and all other injection events in the injection event group are each designated priming injection events.

6. The computerized method of aspect 1, wherein analyzing the injection event group based on the first dose detection algorithm comprises: determining a number of injection events in the injection event group is equal to two, wherein the injection event group comprises: a first injection event associated with a first time; and a second injection event associated with a second time that is later than the first time; and determining whether a first injection amount associated with the first injection event is greater than a second injection amount associated with the second injection event.

7. The computerized method of aspect 6, further comprising, upon determining the first injection event is greater than the second injection event, determining the dose based on a sum of the first injection amount and the second injection amount.

8. The computerized method of aspect 6, further comprising, upon determining the first injection event is not greater than the second injection event, determining the dose is equal to the second injection amount.

9. The computerized method of aspect 8, wherein the first injection event is designated a priming injection event.

10. The computerized method of aspect 1, wherein analyzing the injection event group based on the second dose detection algorithm comprises determining whether a change time associated with the medication delivery device change is (i) later than or earlier than each time associated with each injection event in the injection event group, or (ii) later than a time associated with at least one injection event in the injection event group and earlier than another time associated with at least one other injection event in the injection event group.

11. The computerized method of aspect 10, further comprising, upon determining the change time is later than or earlier than each time associated with each injection event in the injection event group, determining the dose is equal to an injected amount associated with a latest injection event of the injection event group, wherein the latest injection event occurred later in time than any other injection event in the injection event group.

12. The computerized method of aspect 11, wherein the remaining injection events are designated priming injection events.

13. The computerized method of any of aspects 10 or 11, further comprising, upon determining the change time is later than a time associated with at least one injection event in the injection event group and earlier than another time associated with at least one other injection event in the injection event group, determining: a first sub-injection event group comprising each injection event in the injection event group associated with a time that occurred before the change time; and a second sub-injection event group comprising each injection event in the injection event group associated with a time that occurred after the change time.

14. The computerized method of aspect 13, further comprising determining the dose based on a sum of: a first latest injection event in the first sub-injection event group, wherein the first latest injection event occurred later in time than any other injection event in the first sub-injection event group; and a second latest injection event in the second sub-injection event group, wherein the second latest injection event occurred later in time than any other injection event in the second sub-injection event group.

15. The method of aspect 14, wherein the remaining injection events in the first sub-injection event group and the remaining injection events in the second sub-injection event group are designated priming injection events.

16. The method of aspect 1, further comprising determining the injection event group.

17. The method of aspect 16, wherein: determining the injection event group comprises determining the plurality of injection events meet a predetermined criterion; and determining the plurality of injection events meet a predetermined criterion comprises determining, for each injection event of the plurality of injection events, a time associated with the injection event is within a predetermined time period of a previous injection event in the plurality of injection events.

18. A non-transitory computer-readable media comprising instructions that, when executed by one or more processors on a computing device, are operable to cause the one or more processors to execute the method of any of aspects 1-17.

19. A system comprising a memory storing instructions, and a processor configured to execute the instructions to perform the method of any of aspects 1-17.

20. A computerized method for determining a dose injected into a user by one or more medication delivery devices, the method comprising: accessing data indicative of an injection event group comprising one or more injection events associated with one or more medication delivery devices, wherein each of the one or more injection events occurs within a predetermined time period, and wherein each of the one or more medication delivery devices comprises: a dose adjustment mechanism that allows a user to adjust a dose amount for an injection of the medication delivery device, a reservoir sized sufficiently to hold medication for a plurality of doses, one or more sensors to detect an amount of dose dispensed for each injection, and a wireless communication unit that communicates amount of dose dispensed and time dispensed; determining the dose administered to the user, comprising: determining whether the injection event group comprises a first injection event and a second injection event occurring after the first injection event, and upon determining the injection event group comprises the first injection event and the second injection event, determining whether the first injection event is associated with a dose administered to the user or a priming dose not administered to the user based on a time period between the first injection event and the second injection event.

21. The computerized method of aspect 20, wherein the predetermined time period is between four and six minutes.

22. The computerized method of aspect 20, wherein determining the dose administered to the user comprises determining whether an injection event in the injection event group is associated with a dose administered to the user or a priming dose not administered to the user based on a dose size of the injection event.

23. The computerized method of aspect 22, further comprising: determining whether the dose size is greater than a first predetermined threshold; upon determining that the dose size is greater than the first predetermined threshold, determining the injection event is associated with the dose administered to the user; and upon determining that the dose size is not greater than the first predetermined threshold, determining the dose administered to the user based on whether there is a next injection event occurring after the injection event in the injection event group.

24. The computerized method of aspect 23, wherein the first predetermined threshold is a dose size between nine and eleven units.

25. The computerized method of aspect 23, further comprising, upon determining that the dose size is not greater than the first predetermined threshold: determining whether there is a next injection event occurring after the injection event in the injection event group; upon determining that there is no next injection event in the injection event group, determining the injection event is associated with the dose administered to the user; and upon determining that there is the next injection event in the injection event group, determining the dose administered to the user based on the time period between the injection event and the next injection event in the injection event group.

26. The computerized method of aspect 20, wherein determining the dose administered to the user based on the time period between the first injection event and the second injection event comprises: determining whether the time period is less than a second predetermined threshold; upon determining that the time period is less than the second predetermined threshold, determining the first injection event is associated with the priming dose not administered to the user; and upon determining that the time period is not less than the second predetermined threshold, determining the dose administered to the user based on the dose size of the first injection event.

27. The computerized method of aspect 26, wherein the second predetermined threshold is a time period between 75 and 85 seconds.

28. The computerized method of aspect 26, wherein determining the dose administered to the user based on the dose size of the first injection event comprises: determining whether the dose size is greater than a third predetermined threshold; upon determining that the dose size is greater than the third predetermined threshold, determining the first injection event is associated with the dose administered to the user; and upon determining that the dose size is not greater than the third predetermined threshold, determining the first injection event is associated with the priming dose not administered to the user.

29. The computerized method of aspect 28, wherein the third predetermined threshold is a dose size between four and five units.

30. A non-transitory computer-readable media comprising instructions that, when executed by one or more processors on a computing device, are operable to cause the one or more processors to execute the method of any of aspects 20-29.

31. A system comprising a memory storing instructions, and a processor configured to execute the instructions to perform the method of any of aspects 20-29.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

FIGS. 3A-3B are tables showing examples of injection event groups, according to some embodiments;

FIGS. 5A-5C are tables showing examples of dose determination for injection event groups that are not associated with a medication delivery device change, according to some embodiments;

FIGS. 6A-6B are tables showing examples of dose determination for injection event groups that are associated with a medication delivery device change, according to some embodiments;

FIGS. 8A-8E are tables showing examples of dose determinations for exemplary injection event groups with injection events occurring within a predetermined time period of five minutes, according to some embodiments;

FIGS. 10A-10C are tables showing examples of dose determinations for exemplary injection event groups, according to some embodiments.

DETAILED DESCRIPTION

Figure 1:
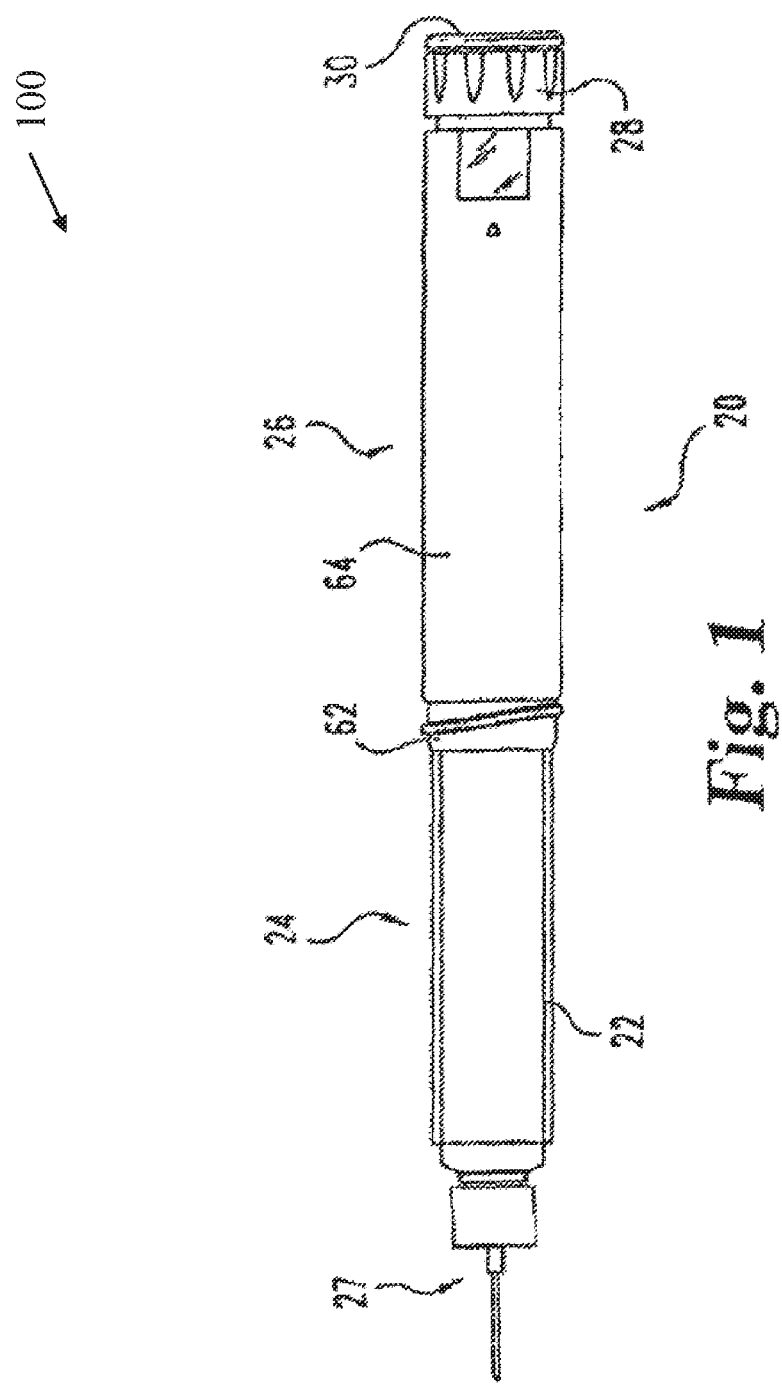
FIG. 1 is an illustrative example of a medication delivery device, according to some examples.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

The present disclosure relates to techniques for accurately determining dose injection information. Medication delivery devices, such as insulin pens, can be either disposable or reusable. Disposable pens are discarded and replaced in its entirety when a user exhausts the insulin in the reservoir. Reusable pens have a port that receives an insulin cartridge. Once the cartridge is exhausted, the user can discard the old cartridge and insert a new cartridge. For example, U.S. Pat. No. 7,195,616, entitled MEDICATION INJECTOR APPARATUS WITH DRIVE ASSEMBLY THAT FACILITATES RESET and issued on Mar. 27, 2007, which is hereby incorporated by reference herein in its entirety, describes examples of reusable insulin pens.

Insulin pens generally need to be periodically primed before use. Priming typically includes the user intentionally ejecting a small amount of insulin (e.g., into the air) in order to clear out excess air residing in the needle, or elsewhere in the fluid path between the pen's insulin reservoir and the needle tip. If a pen is not properly primed before use, air in the needle and/or fluid path may cause the pen to inject less than the requested amount of insulin.

Since it can be cumbersome and error prone for users to manually keep track of injections and doses, medication delivery devices can include wireless functionality (e.g., WiFi, Bluetooth, NFC, and/or the like) that can wirelessly report injection event information, including the time and dose size of insulin injections. As used herein, an "injection event" can refer to a discrete dose of insulin delivered at a specific time. The injection event information can be communicated to remote devices, such as smartphones (e.g., running mobile applications) or cloud servers. There is a need to distinguish between a true injection dose, in which insulin is injected into a patient's body, and a priming dose that is not injected into the patient. If a priming dose is mistaken for a true dose, the remote device and/or cloud server may incorrectly determine that the user injected more insulin than he/she actually injected. Such incorrect determinations can, in turn, affect the validity of the user's insulin dose logs, and the calculation of the amount of insulin-on-board (e.g., the amount of active, unused insulin circulating through a user's body). Incorrect insulin-on-board calculations can, in turn, affect the validity of later bolus calculations.

There is also a need to identify split doses, in which a user splits a single dose across two or more pens (e.g., disposable insulin pens), or replaces an insulin cartridge of a reusable pen in the middle of a dose.

The following example illustrates the need for detecting both priming doses and split doses. Assume a user needs to dose 15 units of insulin, but there are only 7 units left in her pen. The user may prime her pen by expelling a small dose of 2 units into the air. The user then injects the remaining 5 units. The user then discards the empty pen and selects a new pen (or replaces the spent insulin cartridge, if the pen is a reusable pen). The user primes the new pen (or new insulin cartridge) by expelling 3 small doses of 2 units each, until the user perceives there is no air left in the needle. Once the new pen or cartridge is properly primed, the user injects the remaining 10 units.

A device receiving injection event data for this example would receive data indicative of the following sequence of injection doses: 2, 5, 2, 2, 2, and 10 units of insulin. If the device assumed all of these doses were true doses, it would overestimate the amount of insulin the user actually took (e.g., it would determine the user injected 23 units of insulin, when in fact the user had only injected 15 units). Therefore, there is a needed to distinguish between true doses actually injected into the patient and priming doses, and also to identify when a dose has been split across two separate pens or cartridges.

The techniques described herein provide for computer-implemented techniques (e.g., computer applications, such as mobile phone applications or cloud-based applications) that provide for accurately determining a dose injected into a patient by a medication delivery device. In some embodiments, the techniques can be configured to determine groups of injection events, such as based on the injection event times (e.g., by grouping injection events that occur within five minutes of each other). Such injection event groups may comprise any group of one or more injection events. In some embodiments, the techniques can be configured to process the injection event groups depending on whether the injection event group is associated with a device change (e.g., a user switching to a new disposable medication delivery device and/or changing the medication cartridge of a reusable medication delivery device). If the injection event group is not associated with a device change, the techniques can process the injection event group according to a first algorithm configured to determine dose information for injection event groups that are not associated with a device change. If the injection event group is associated with a device change, the techniques can process the injection event group using a second algorithm configured to determine dose information for injection event groups that are associated with a device change.

In some embodiments, the techniques can be configured to determine groups of injection events that occur within a time period (e.g., injection events that occur within a five minute period). In some embodiments, the dose administered to the user can be determined by determining whether each of the injection events is associated with a dose administered to the user or a priming dose not administered to the user. This determination can comprise determining whether an injection event group comprises a first injection event and a second injection event occurring after the first injection event. Upon determining the injection event group comprises the first injection event and the second injection event, the determination can be further based on a time period between the first injection event and the second injection event.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

FIG. 1 is an illustrative example of a medication delivery device 20, according to some examples. The medication delivery device 20 is a reusable, medication injection pen. As is generally known in reusable devices of its type, injection pen 20 includes a medication filled cartridge or reservoir 22 as part of a cartridge assembly, generally designated 24, which is connected to a reusable pen base, generally designated 26. The cartridge or reservoir 22 is sized sufficiently to hold medication for a plurality of doses. Pen base 26 preferably includes dose setting and injecting mechanisms that function to allow a quantity of medicine to be selected and then expelled from cartridge assembly 24 through the injection needle assembly 27 shown attached thereto. As shown, an exposed knob 28 with rotatable button 30 thereon at the rearward or proximal end of pen base 26 is a manually operable portion of the dose setting and injecting mechanisms otherwise housed within pen base 26. During the dose setting process, knob 28 is designed to be rotatable to set the dose, and when knob 28 is so rotated to increase the selected dose the knob 28 and button 30 translate out of pen base 26 from the axial position shown in FIG. 1, or to the right from the perspective of a FIG. 1 viewer. During the dose injecting process which occurs after the dose setting process, when a plunging force is applied to button 30, which rotates freely relative to knob 28, button 30 and knob 28 are designed to be shifted to the left, and back to the axial position shown in FIG. 1, to cause the injecting mechanism components housed within the pen base to operate to cause the medicine in the cartridge to be injected.

In some embodiments, medication delivery devices can include one or more sensors used to detect a dose dispensed for each injection. For example, the medication delivery device can include one or more sensors configured to detect movement of and/or changes of components of the medication delivery device. Examples of such sensors can include magnetic field sensors, switches, accelerometers, gyroscopes, and/or the like. As another example, the medication delivery device can include sensors to determine the setting of a dose setting member. U.S. Pat. No. 7,195,616, incorporated by reference in its entirety above, contains some non-limiting examples of such sensors.

In some embodiments, medication delivery devices can include one or more sensors used to detect when a user changes a medication cartridge (e.g., when a user changes reservoir 22). For example, the medication delivery device can include one or more switches and/or pressure sensors to detect removal of and/or insertion of a cartridge into the medication delivery device.

In some embodiments, medication delivery devices can include a processing unit (or units), such as central processing units (CPUs), microcontroller units (MCUs), application specific integrated circuits (ASICs), etc. In some embodiments, the processing unit can be configured to determine, using data generated from the sensors, a dose of an injection and/or insertion/removal of a cartridge. In some embodiments, the processing unit can be configured to perform the techniques described herein, including determining a dose of an injection.

In some embodiments, the medication delivery device can include a communication unit. The communication unit can be a wired communication unit (e.g., Universal Serial Bus (USB), FireWire, Serial, etc.) and/or a wireless communication unit (e.g., Bluetooth, WiFi, near-field communication (NFC), and/or the like). For example, the communication unit can be a WiFi transceiver, a Bluetooth transceiver, an RFID transceiver, a USB transceiver, a near-field communication (NFC) transceiver, a combination chip, and/or the like. The processing unit can be configured to transmit, using the communication unit, injection event information (e.g., including a dose dispensed and time dispensed), cartridge change information, and/or other information to a separate device.

Figure 2:
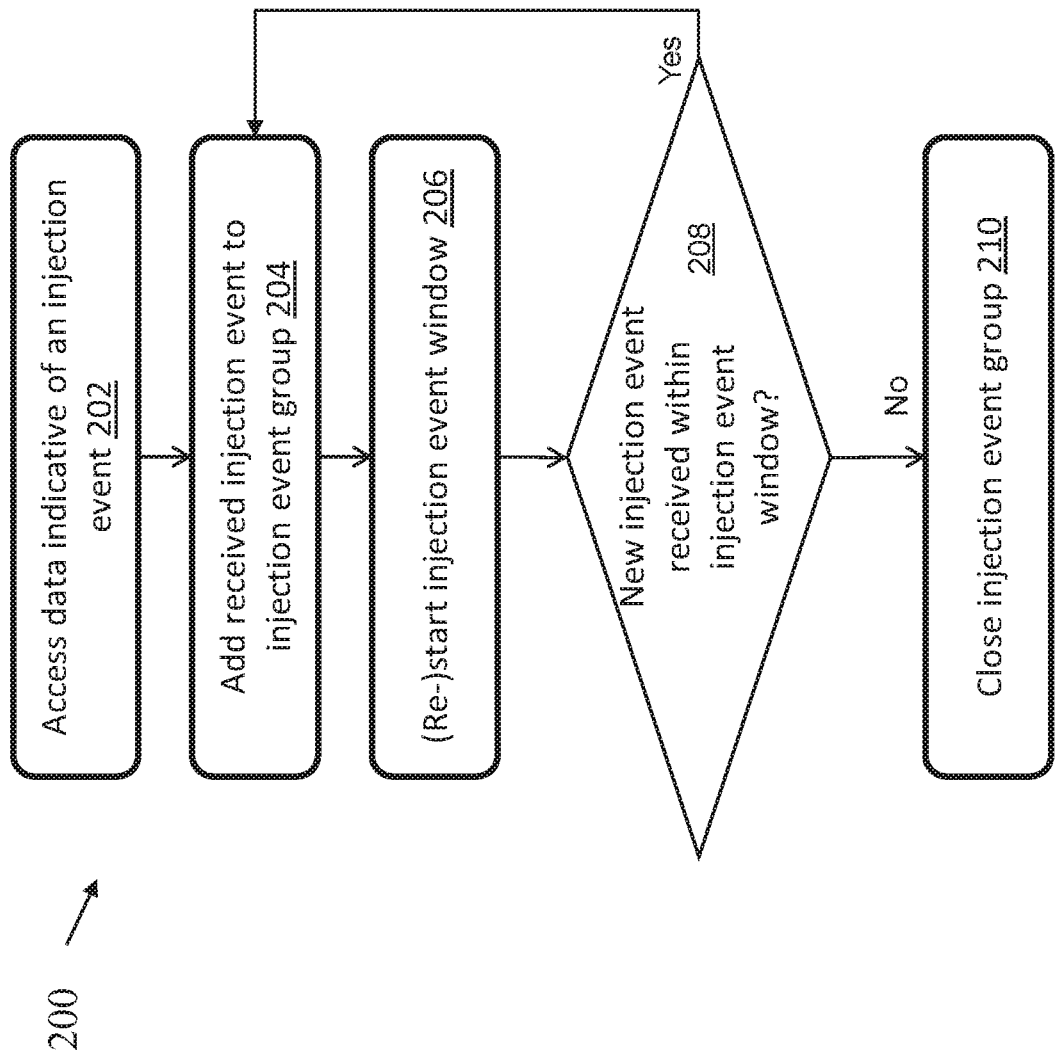
FIG. 2 is a flow chart showing an exemplary computerized process for determining an injection event group, according to some embodiments.

FIG. 2 is a flow chart showing an exemplary computerized process 200 for determining an injection event group, according to some embodiments. The process 200 can be performed by, for example, a medication delivery device, a smartphone, a server, and/or the like. At step 202, the device accesses data indicative of an injection event. For example, the device can receive a set of injection events from the medication delivery device at substantially the same time (e.g., in a batch report), or the device can receive each injection event separately from the medication delivery device as each injection event occurs.

At step 204, the device adds the received injection event to a currently open injection event group. If there is no currently open injection event group, the device creates a new currently open injection event group.

At step 206, the device starts an injection event window. The injection event window may comprise a period of time during which the device will add any newly received injection events to the currently open injection event group. In some embodiments, starting the injection event window may comprise starting a timer.

At step 208, the device determines whether it accessed data indicative of a new injection event within the injection event window, e.g., before the timer expires. If so, the device proceeds back to step 204 (where it adds the new injection event to the currently open injection group), to step 206 (where it restarts the injection event window), and to step 208 (where it determines whether it accessed data indicative of a new injection event within the newly re-started injection event window). If no new injection event is received within the injection event window, the device proceeds to step 210 and closes the injection event group. If additional new injection events are received within the newly re-started injection event window, the device proceeds back to step 204. In this way, the device repeats steps 204, 206, and 208 until no new injection event is received within the then-current injection event window.

In operation, for example, the device can group one or more injection events into a single injection event group if each injection was delivered within (e.g., less than or equal to) 5 minutes apart from the previous injection in time—in this example, the injection event window has a duration of 5 minutes. So for instance, if the injection event data shows that the pen delivered a second injection 4 minutes after a first injection, and then a third injection 3 minutes after the second injection, the device would group all three injections into the same injection event group (e.g., even though the elapsed time between the first and the third injection events is 7 minutes).

Process 200 can be modified in various ways. For example, in some embodiments, the device may not restart the injection event window every time a new injection event is received. In such embodiments, all injection events must be received within a certain time period of the first injection event in order to be grouped into the same injection event group. In some embodiments, the device can optionally determine whether injection events fulfil certain predetermined criteria before adding the injection event to the currently open injection event group. For example, the device can be configured to add only injection events that are greater than a certain minimum dose size (e.g., 1 unit), that last more than a certain minimum time duration, or that last less than a certain maximum time duration, to the currently open injection event group. Any injection events that do not fulfil this predetermined criteria may not be added to the currently open injection event group.

FIGS. 3A-3B are tables 300, 350 showing examples of injection event groups, according to some embodiments. As shown in table 300, one injection event 302 occurs at 4:42:03 PM with a dose of two units, and after five minutes at 4:47:03 PM, no additional injection events occurred and therefore the injection event 302 is the sole injection event in the injection event group. In this example, the injection event 302 is determined to be an injection event (e.g., as opposed to a priming event) since it is the only injection event in the injection event window. As shown in table 350, the injection event group (group 1, in this example) includes five different injection events 352-360. As shown, each injection event is within five minutes of the previous injection event. For example, injection event 354 occurred at 4:55:19 PM, which is within five minutes of injection event 352, which occurred at 4:55:14 PM.

Figure 4A:
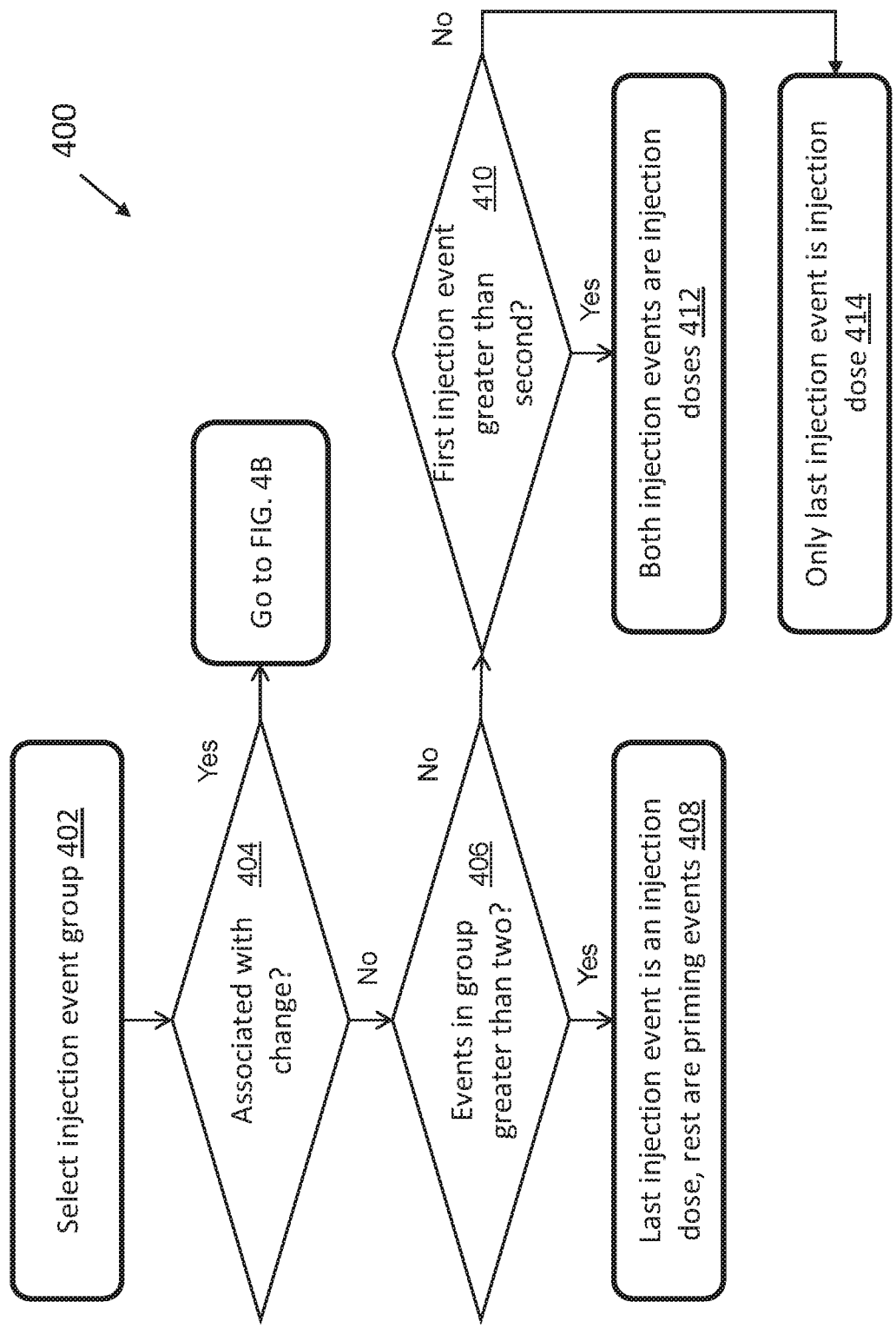
FIGS. 4A-4B are flow charts showing an exemplary computerized process for determining a dose based on an injection event group, according to some embodiments.

FIG. 4A is a flow chart showing an exemplary computerized process 400 for determining a dose based on an injection event group, according to some embodiments. At step 402, the device (e.g., medication delivery device, smartphone, server, and/or the like) accesses an injection event group that includes one or more injection events. As described herein, an injection event group can include injection events that are associated with (e.g., delivered by) one or more medication delivery devices.

At step 404, the device determines whether the injection event group is associated with a medication delivery device change. In some embodiments, a device change can include switching from one single-use medication delivery device to another single-use medication delivery device and/or changing the medication cartridge of a reusable medication delivery device. In some embodiments, a medication delivery device may store and/or report data indicative of when a cartridge is changed, when a disposable medication delivery device has exhausted the medication in the reservoir, and/or when a new disposable medication delivery device has been substituted for a previous disposable medication delivery device. In some embodiments, a device change can be determined from other information. For example, when a user selects a new disposable medication delivery device, the user may need to first pair the medication delivery device with another device, such as an attachable module, an application running on a smartphone, a server, and/or the like. The device can determine that there is a device change when a new medication delivery device is paired with the device and/or paired with another device in the system.

In some embodiments, an injection event group can be determined to be associated with a device change if the change time is within a predetermined amount of time of the injection event group, a time window determined based on the injection event group, and/or the like. For example, the device can determine an injection event group is associated with a device change if the user changed pens or changed a replaceable cartridge during the time period starting from 5 minutes before the first injection event in the group and ending with the time of the last injection event in the group. As another example, the device can determine an injection event group is associated with a device change if the user changed pens or changed a replaceable cartridge during the time period starting from 5 minutes before the first injection event in the group and ending 5 minutes after the time of the last injection event in the group.

If the injection event group is not associated with a change, the method proceeds to step 406 to analyze the injection event group based on a first dose detection algorithm shown in steps 406 through 414 to determine the dose administered to the user. If the injection event group is associated with the medication delivery device change, the method proceeds to the method shown in FIG. 4B, described further below, to analyze the injection event group based on a second dose detection algorithm to determine the dose administered to the user.

At step 406, the device determines whether there are three or more injection events in the injection event group. If there are three or more injection events, the method proceeds to step 408, and the device determines that the dose administered to the patient is equal to the dose associated with the last injection event in the group (which is the injection event that occurred later in time than any other injection event). The device can designate the remaining injection events as priming injection events.

If there are not three or more injection events, then the method proceeds to step 410. While not shown in the flow chart in FIG. 4A, if the injection event only includes one event, the system can be configured to determine that the injection event includes an injected dose. At step 410, if there are two injection events in the injection event group, the device determines whether the dose of the injection event that occurred first in time is greater than the dose of the second injection event that occurred later in time. If the dose of the first injection event is greater than the dose of the second injection event, the method proceeds to step 412 and determines the dose based on a sum of the doses of both injection events. If the dose of the first injection event is not greater than the dose of the second injection event, the method proceeds to step 414 and the device determines that the dose administered to the patient is equal to the dose of the second injection event. The device can designate the first injection event as a priming injection event.

In some embodiments, step 410 may be modified to cause the method to proceed to step 412 only if the dose of the first injection event is greater than the dose of the second injection event by a predetermined threshold. If the dose of the first injection event is not greater than the dose of the second injection event by the predetermined threshold, the method may proceed to step 414. The predetermined threshold may be an absolute number of units of insulin (e.g., 7 units) or may specify a required minimum ratio of the first injection dose to the second injection dose (e.g., the ratio of the first injection dose to the second injection dose must exceed 5:1).

FIGS. 5A-5C are tables 500, 530 and 560, respectively, showing examples of dose determinations for injection event groups that are not associated with a medication delivery device change, according to some embodiments. Referring to table 500 in FIG. 5A, the injection event group includes two injection events 502 and 504. Since there are only two injection events, the device compares the dose amounts of the two injections. Since the dose of injection two 504 (33 units) is greater than the dose of injection one 502 (2 units), the device determines that the injected dose is 33 units, and that the first injection event is a priming event that does not count towards the amount injected by the user.

Referring to table 530 of FIG. 5B, the injection event group includes three injection events 532, 534 and 536. Since there are three injection events, the device determines that the last injection event 536 is an injection event, and that the other two injection events 532 and 534 are priming events.

Referring to table 560 in FIG. 5C, the injection event group includes two injection events 562 and 564. Since there are only two injection events, the device compares the dose amounts of the two injections. Since the dose of the first injection event 562 (12 units) is greater than the dose of the second injection event 564 (2 units), the device determines that each injection event is an injection, and therefore the injected amount is equal to the combination of the two doses, namely 14 units.

Figure 4B:
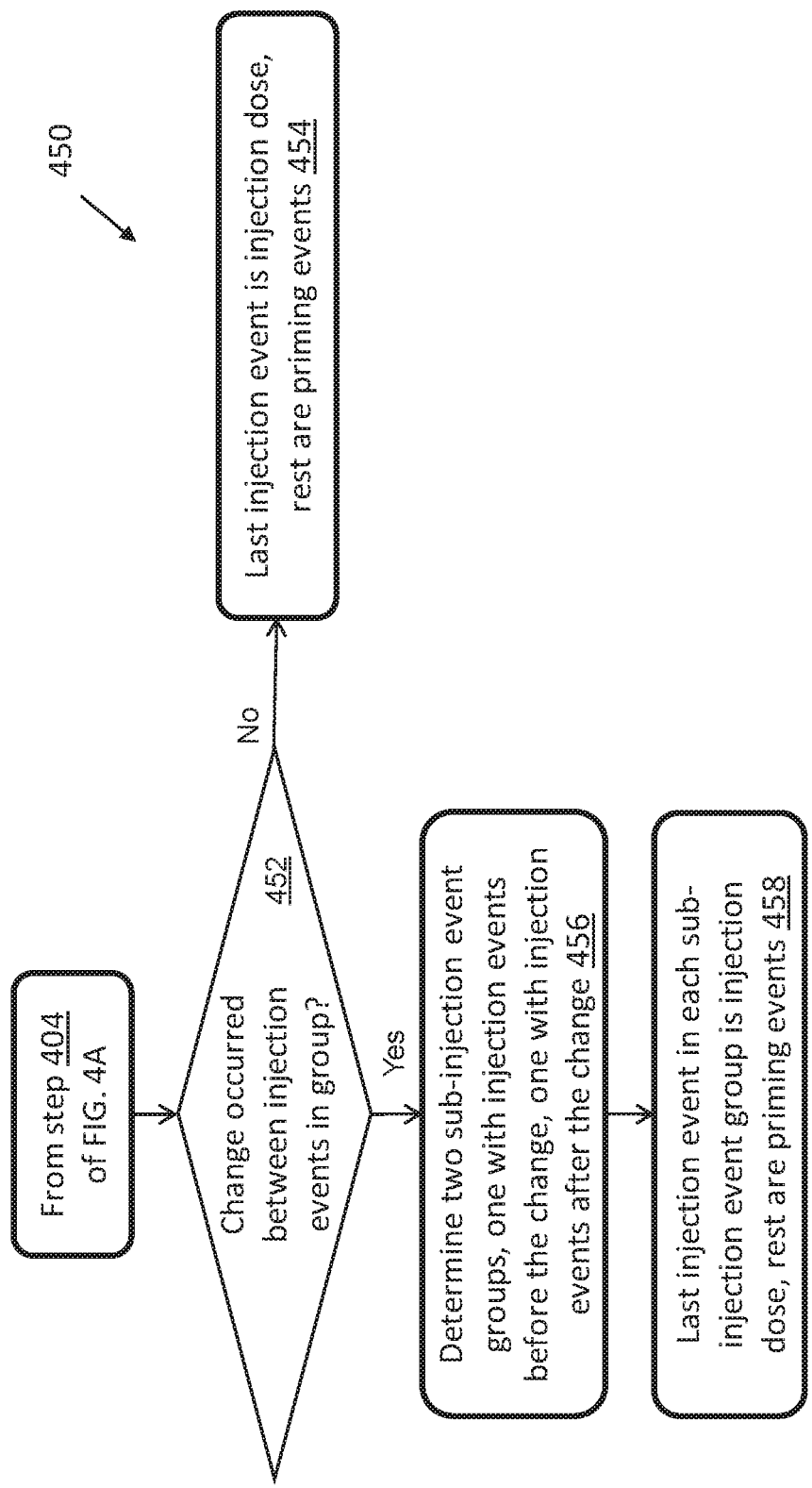

FIG. 4B is a flow chart showing an exemplary computerized process 450 for determining a dose based on an injection event group that is associated with a medication delivery device change, according to some embodiments. At step 452, the device determines whether the medication delivery device change occurred between injection events in the injection event group. If the change time occurred either before or after all injection events in the injection event group, then the device proceeds to step 454 and determines that the last injection event (the event occurring after the other injection events in the group) is the injected dose, while the rest of the injection events are priming events. For example, as described herein, an injection event group can be associated with a change event if the change event occurred within a certain time period after the injection events in the injection event group (e.g., within five minutes after the time of the last injection event). As another example, as described herein, an injection event group can be associated with a change event if the change event occurred within five minutes before all injection events in the injection event group. If all injection events in the injection event group occurred before or after the change, then the method can proceed to step 454 and determine that the last injection event is the injected dose, while the rest of the injection events are priming events. Otherwise, the method can proceed to step 456, as discussed below.

If the change time occurred between injection events, the device proceeds to step 456 and determines two sub-injection groups. The first sub-injection event group includes each injection event in the injection event group that occurred before the change time. The second sub-injection event group includes each injection event in the injection event group that occurred after the change time. At step 458, the device determines the injected dose based on the last injection events in each sub-injection event group. In particular, for the first sub-injection event group, the device determines that the latest injection event (which occurred after the other injection events in the first sub-injection event group) is an injected dose, while the remaining injection events (if any) are priming events. Similarly, for the second sub-injection event group, the device determines that the latest injection event is an injected dose, while the remaining injection events (if any) are priming events. Therefore, the device can determine the total injected dose by adding the doses of the last injection events in each sub-injection event group.

FIGS. 6A-6B are tables 600, 650 showing examples of dose determination for injection event groups that are associated with a medication delivery device change, according to some embodiments. Referring to table 600 in FIG. 6A, the table 600 includes five injection events 602-610. As shown by the third column in table 600, the change time (e.g., the time the user changed the cartridge and/or the time the user switched to a new pen) is 4:54:56 PM. Since the change time occurred before all of the injection events 602-610 (which occurred between 4:55:14 PM-4:55:34 PM), the device determines that the last injection event 610 represents the injected dose, such that the injected dose is 4 units), while the remaining injection events are priming events.

Referring to table 650 in FIG. 6B, the table 650 includes two injection events 652 and 654. As shown by the third column, the change time is 7:41:55 PM, which occurs between the first injection event 652 time of 7:39:31 PM and the second injection event 654 time of 7:42:10 PM. The system would therefore determine two different sub-injection event groups. In this example, each sub-injection event group includes just one injection event: the first sub-injection event group includes injection event 652, and the second sub-injection event group includes injection event 654. The last (and only) injection event in each sub-injection event group is identified as including an injected dose. Therefore, the injected dose for the example shown in table 650 is six units.

In some embodiments, the dose administered to the patient can be determined using other methods that do not require determining whether the injection event group is associated with a medication delivery device change. Such methods may be used when medication delivery device change information is unavailable. Such methods may determine the dose administered to the patient by using an injection event group that includes injection events in a certain time period (e.g., injection events that occur within a certain number of minutes, seconds, etc.). The techniques can include determining the dose administered to the user by determining whether each of the one or more injection events is associated with a dose administered to the user or a priming dose not administered to the user. This determination may comprise determining whether the injection event group comprises a first injection event and a second injection event occurring after the first injection event. Upon determining the injection event group comprises the first injection event and the second injection event, the determination may be based on a time period between the first injection event and the second injection event (e.g., a ranking of the time period to time periods of other sequential injection events, and/or whether the time period is greater than a predetermined time period). The determination may also optionally be based on one or more of: a dose size of the injection event (e.g., whether the dose size is greater than a number of units) and a position of the injection event in the injection event group (e.g., whether the injection event is the only remaining injection event in the injection event group, or if there are more injection events).

Figure 7:
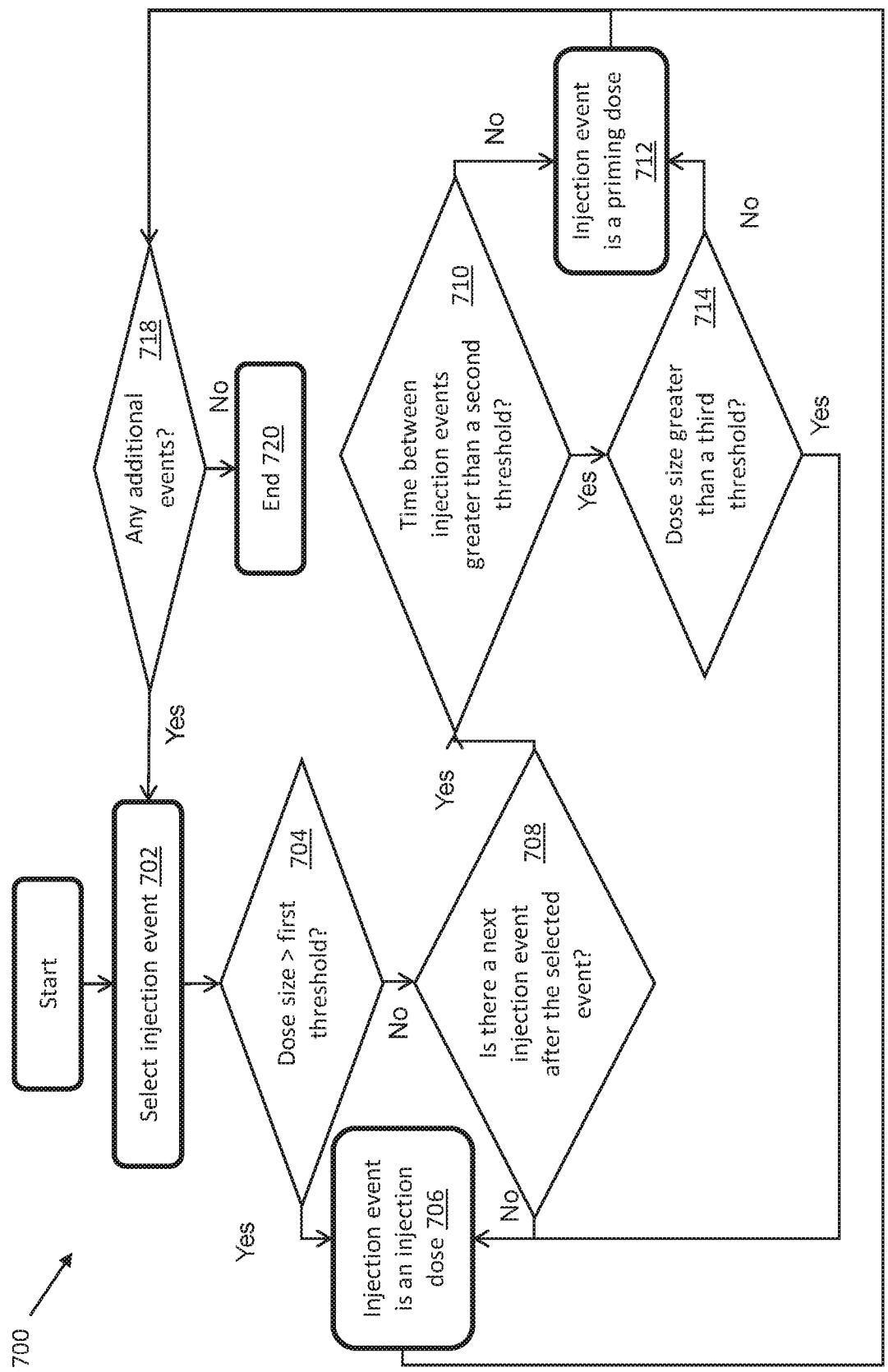
FIG. 7 is a flow chart showing an exemplary computerized process for determining a dose based on an injection event group comprising one or more injection events that occur within a predetermined time period, according to some embodiments.

FIG. 7 is a flow chart showing an exemplary computerized process 700 for determining a dose based on an injection event group comprising one or more injection events that occur within a predetermined time period, according to some embodiments. At step 702, the device selects an injection event from the injection event group. The injection event group can include one or more injection events. In some embodiments, the injection event group is a set of one or more injection events that occur during a predetermined time period. For example, the injection event group can include all injections that occur in a three minute, five minute, seven minute, and/or other time period after the first injection event in the injection event group. In some embodiments, the device can access data pertaining to multiple injection events of the injection event group at substantially the same time (e.g., as a batch download of pre-recorded data for some or all of the set of injection events in the injection event group). In some embodiments, the device accesses one or more injection events of the injection event group separately, such as by receiving data indicative of each injection event separately in time (e.g., upon the occurrence of each injection event and/or shortly after the occurrence of each injection event). Therefore, step 702 can include selecting an injection event from a plurality of injection events and/or processing a single injection event (e.g. upon receipt from a medication delivery device and/or upon occurrence of the injection event).

At step 704, the device determines whether the dose size of the selected injection event is greater than a first predetermined threshold. For example, the predetermined threshold can be 6 units, 7 units, 9 units, 10 units, 11 units, and/or the like. If the dose size is greater than the threshold, the method proceeds to step 706 where the device determines that the selected injection event is associated with an injection dose administered to the user. If the dose size is not greater than the first predetermined threshold, the method proceeds to step 708 and determines whether there is a next injection event in the injection event group that occurs after the selected injection event. If there are no other injection events, the method proceeds to step 706, at which the device determines that the selected injection event is associated with an injection dose administered to the user. After step 706, the method proceeds to step 718, described below. If the method determines there is a next injection event at step 708, then the method proceeds to step 710.

As described herein, the injection events of the injection event group may be accessed as a set of injection events (e.g., receiving and/or accessing a batch of pre-recorded data indicative of the injection events at substantially the same time) and/or may be accessed separately (e.g., received separately in time upon or shortly after the occurrence of each injection event). In some embodiments, when the injection events are accessed separately, step 708 can include the device determining whether or not the device receives a next injection event within an injection event window (e.g., within a predetermined time period, such as three minutes, five minutes, seven minutes, or some other time period) of a first injection event (e.g., the injection event selected in step 702). In some embodiments, when one or more injection events are accessed as a group of events, step 708 can include analyzing the data of the group of events to determine whether there is a next injection event.

At step 710, the device determines whether the time between the selected injection event and the next injection event is greater than a second predetermined threshold. For example, the device can determine whether the next injection event occurs more than a predetermined number of seconds after the selected injection event (e.g., greater than 59.5 seconds, 60 seconds, 60.5 seconds, 79.5 seconds, 80 seconds, etc.). If the time between events is not greater than the threshold, the method proceeds to step 712, where the device determines that the selected injection event (i.e., the injection event selected at step 702) is associated with a priming dose that is not administered to the user. After step 712, the method proceeds to step 718.

If the time between injection events is greater than the second predetermined threshold, then the method proceeds to step 714 and the device determines whether the dose size of the selected injection event is greater than a third predetermined threshold. For example, the device can determine if the dose size is greater than 3 units, 3.5 units, 4 units, 4.5 units, 5 units, 5.5 units and/or the like. If the dose size is not greater than the threshold, the method proceeds to step 712, where the device determines that the selected injection event is associated with a priming dose not administered to the user, and then the method proceeds to step 718. If the dose size is greater than the third predetermined threshold, the method proceeds to step 706, and the device determines that the selected injection event is associated with an injection dose administered to the user.

Following steps 706 and 712, the method proceeds to step 718, where the device determines whether there are any additional injection events in the injection event group that need to be classified either as an injection dose or a priming dose. If there are no additional events, then the method proceeds to step 720 where the device ends the process of dose detection. If there are additional injection events, then the method proceeds back to step 702, selects the next injection event in the injection event group, and repeats the process as described herein.

FIGS. 8A-8E are tables 800, 820, 840, 860, and 880, respectively, showing examples of dose determinations for exemplary injection event groups with injection events occurring within a predetermined time period of 5 minutes, according to some embodiments. For these examples, the dose size for the first threshold is 10 units, the time between injection events for the second threshold is 79.5 seconds, and the dose size for the third threshold is 4.5 units.

Referring to table 800 in FIG. 8A, the device selects the first injection event 802 and determines that the respective dose size of 11 units is greater than the predetermined threshold of 10 units. Therefore, the device determines that the first injection event 802 is associated with a dose administered to the user. The device then selects the second injection event 804, and determines that the respective dose size of 3 units is not greater than the predetermined threshold of 10 units. Therefore, the device proceeds to determine that there are no other injection events in the injection event group following the second injection event 804 and determines that the second injection event 804 is associated with an injection dose administered to the user. The injected dose for the injection event group shown in table 800 is therefore 14 units.

Referring to table 820 in FIG. 8B, the device selects the first injection event 824 and determines that the respective dose size of 3 units is not greater than the predetermined threshold of 10 units. The device then determines that there are no other injection events in the injection event group following the first injection event 824, and therefore determines that the first injection is associated with an injection dose administered to the user. The injected dose for the injection event group shown in table 820 is therefore 3 units.

Referring to table 840 in FIG. 8C, the device selects the first injection event 842 and determines that the respective dose size of 5 units is not greater than the predetermined threshold of 10 units. The device then determines that a second injection event 844 occurs after the first injection event 842, and further determines that the time period of 60 seconds between the first injection event 842 and the second injection event 844 is not greater than the threshold of 79.5 seconds. Therefore, the device determines that the first injection event 842 is associated with a priming dose not administered to the user. Since there is a second injection event 844 that occurs after the first injection event 842, the device then selects that event for analysis. The device determines that the dose size of 3 units is not greater than the threshold of 10 units, and that no other injection events occur within five minutes of the second injection event 844. Therefore, the second injection event 844 is associated with an injection dose administered to the user. The injected dose for the injection event group shown in table 840 is therefore 3 units.

Figure 8D:

Referring to table 860 in FIG. 8D, the device selects a first injection event 862 and determines that the respective dose size of 5 units is not greater than the predetermined threshold of 10 units. The device then determines that a second injection event 864 occurs after the first injection event 862, and further determines that the time period of 81 seconds between the first injection event 862 and the second injection event 864 is greater than the threshold of 79.5 seconds. Additionally, the device determines that the dose size of the first injection event 862 of 5 units is greater than the predetermined threshold of 4.5 units. Therefore, the device determines that the first injection event 862 is associated with an injection dose administered to the user. The device then selects the second injection event 864 and, after determining that the respective dose size of 3 units is not greater than the threshold of 10 units, determines that there are no other injection events following the second injection event 864. Therefore, the device determines that the second injection event 864 is also associated with an injection dose administered to the user. The injected dose for the injection event group shown in table 860 is therefore 8 units.

Figure 8E:

Referring to table 880 in FIG. 8E, the device selects a first injection event 882 and determines that the respective dose size of 2 units is not greater than the predetermined threshold of 10 units. The device then determines that a second injection event 884 occurs after the first injection event 882 and further determines that the time period of 81 seconds between the first injection event 882 and the second injection event 884 is greater than the threshold of 79.5 seconds. Additionally, the device determines that the respective dose size of 2 units is less than the threshold of 4.5 units. Therefore, the device determines that the first injection event 882 is associated with a priming dose not administered to the user. The device then selects the second injection event 884 and, after determining that the respective dose size of 3 units is less than the threshold of 10 units, determines that there is a third injection event 886 that occurs after the second injection event 884. The device determines that the time period of 40 seconds between the second injection event 884 and the third injection event 886 is not greater than the threshold of 79.5 seconds. Therefore, the device determines that the second injection event 884 is also associated with a priming dose that is not administered to the user. Finally, the device selects the third injection event 886 and, after determining that the respective dose size of 3 units is not greater than the threshold of 10 units, determines that there are no other injection events that occur after the third injection event 886. Therefore, the third injection event 886 is associated with an injection dose administered to the user. The injected dose for the injection event group shown in table 880 is therefore 3 units.

One advantage of process 700 for determining a dose is that does not require medication delivery device change information, which may not always be available. Another advantage of process 700 is that any given injection event may be classified as being associated with an injection dose administered to the user or a priming dose not administered to the user within five minutes of that given injection event's occurrence. Process 700 does not require the user wait until all injection events within an injection event group be known before making a classification decision.

In some embodiments, process 700 may be modified by simplifying steps 710 and 714. For example, if process 700 determines at step 708 that there is a next injection event within a certain time period after the selected injection event (e.g., a next injection event within three minutes, five minutes, seven minutes, or some other predetermined time period of the selected injection event), process 700 may automatically classify the selected injection event as a priming dose without going through steps 710 and/or 714. In such embodiments, process 700 may classify the selected injection event as an injection dose while waiting for the predetermined time period after the selected injection event to elapse. If a next injection event is received before the predetermined time period has expired, the selected injection event may be re-classified from an injection dose to a priming dose.

This modified embodiment of process 700 would lead to the same priming vs. injection event classifications as presented in FIGS. 8A-C and 8E, but would lead to a different classification than the one presented in FIG. 8D. Specifically, referring to table 860 in FIG. 8D, under the modified embodiment of process 700, the device selects a first injection event 862 and determines that the respective dose size of 5 units is not greater than the predetermined threshold of 10 units. The device then determines that a second injection event 864 occurs within five minutes (the predetermined time period) after the first injection event 862. Without inquiring further into the time gap between injection events 862 and 864, and without inquiring further into the dose size of injection event 864, the device classifies injection event 862 as a priming dose. The device then selects injection event 864 for analysis. After determining that no further injection events occur within five minutes of injection event 864, the device classifies injection event 864 as an injection dose administered to the user.

Figure 9:
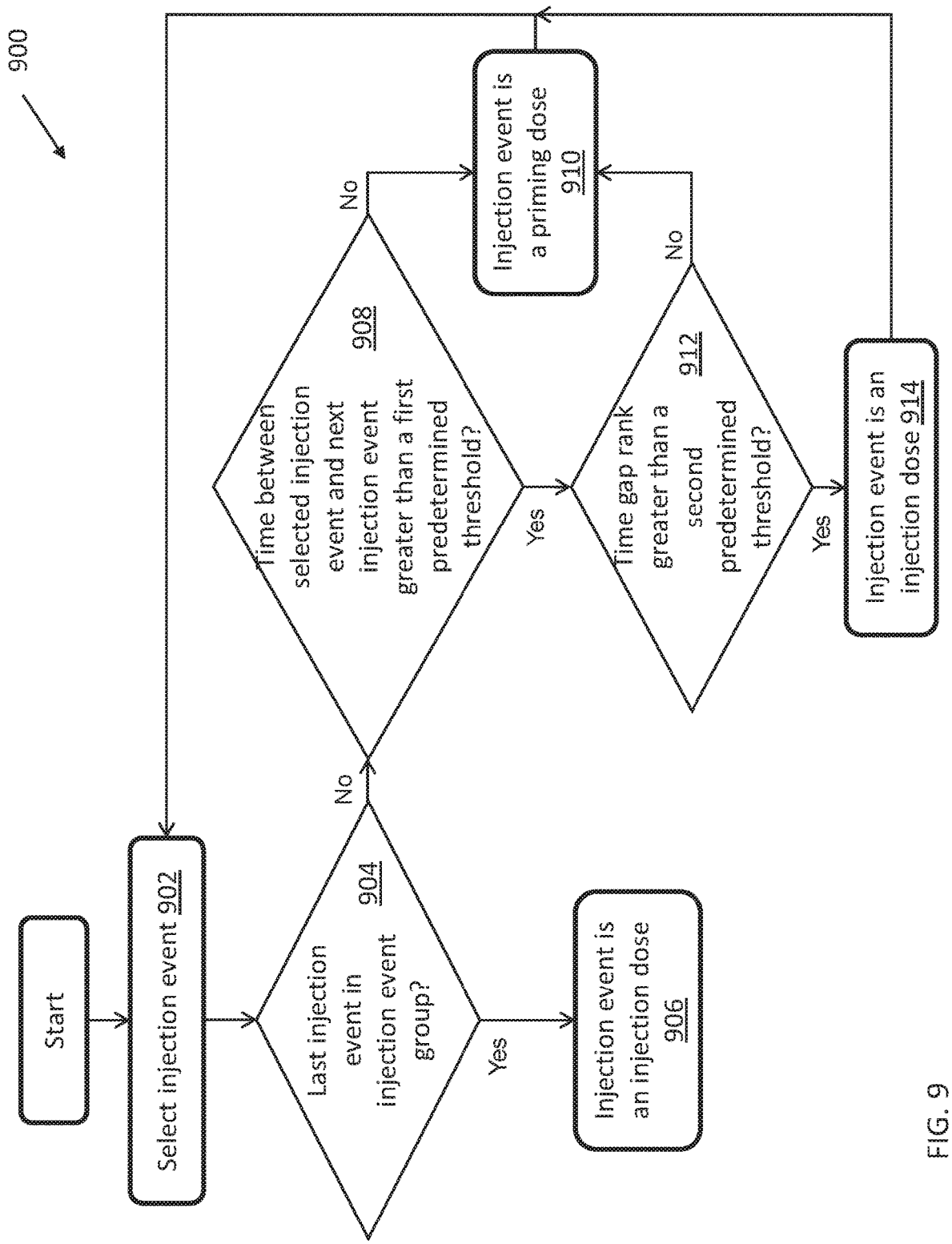
FIG. 9 is a flow chart showing an exemplary computerized process for determining a dose based on an injection event group, according to some embodiments.

FIG. 9 is a flow chart showing another exemplary computerized process 900 for determining a dose based on an injection event group, according to some embodiments. At step 902, the device selects an injection event from the injection event group and proceeds to step 904. As described herein, an injection event group can include one or more injection events that are associated with one or more medication delivery devices. As also described herein, the injection event can include injection events that occur within a predetermined time period, such as a single time period (e.g., five minutes total, ten minutes total, etc.) and/or a time period from each injection (e.g., within five minutes of each injection).

At step 904, the device determines whether the selected injection event is the last injection event in the injection event group. If the selected injection event is the last injection event, then the method proceeds to step 906, and the device determines that the selected injection event is an injection dose administered to the user. If the selected injection event is not the last injection event in the injection event group, then the method proceeds to step 908.

At step 908, the device determines whether the time between the selected injection event and the next injection event in the event group is greater than a first predetermined threshold (e.g. greater than 58.5 seconds, 60 seconds, 60.5 seconds, 73.5 seconds, 80 seconds, etc.). Upon determining that the time between injection events is not greater than the threshold, the method proceeds to step 910, and the selected injection event is determined to be a priming dose that is not administered to the user.

If the time period is greater than the first predetermined threshold, then the method proceeds to step 912, and the device determines whether a time gap rank associated with the selected injection event is greater than or equal to a second predetermined threshold. The time gap rank can be, for example, a ranking of the amount of time between each sequential pair of injection events in an injection event group, as discussed further herein. The second predetermined threshold can be, for example, 2, 3, 4, and/or the like. Upon determining that the time gap rank is not greater than or equal to the second predetermined threshold, the method proceeds to step 912, at which the device determines that the selected injection event is a priming dose that is not administered to the user. However, if the time gap rank is greater than or equal to the second predetermined threshold, the method proceeds to step 914, at which the selected injection event is determined to be an injection event associated with an injection dose administered to the user.

Following steps 910 and 914, the method proceeds back to step 902, selects the next injection event in the injection event group, and repeats the process as described herein.

In some embodiments, the selected injection event can be determined to be the last injection event of the injection event group (step 904) if no other injection events occur within a predetermined time period following the selected injection event. For example, the device can determine an injection event is the last injection event of the injection event group if no other injection events occur within 4 minutes, 5 minutes, 6 minutes, and/or the like, following the selected injection event. Upon making this determination, the device can close the injection event group.

In some embodiments, the time gap rank can be determined by evaluating and comparing the time periods between the consecutive injection events in the injection event group. The time periods between consecutive injection events can be, for example, ordered from the shortest time period between consecutive injection events to the longest time period between consecutive injection events, and assigned a corresponding rank in ascending order. Consider an example with a first, second, and third injection event, where the time period between the first and second injection event is 5 seconds and the time period between the second and third injection event is 3 seconds. The time period associated with the third injection event can be set to zero since there are no other injection events in the injection event group. The corresponding time gap ranks for this example would be 3 for the first injection event (because the time gap of 5 seconds is the greatest of all three time gaps), 2 for the second injection event (because the time gap of 3 seconds is less than the time gap for the first injection event, but greater than the time gap for the third injection event), and 1 for the third injection event (because the time gap of 0 seconds is the smallest of all three time gaps). This is shown in the example of FIG. 10A, discussed further below.

FIGS. 10A-10C are tables 1000, 1030, and 1060, respectively, showing examples of dose determinations for exemplary injection event groups, according to some embodiments. For these examples, the time period between injection events for the first threshold is 73.5 seconds and the time gap rank for the second threshold is 3.

Referring to table 1000 in FIG. 10A, the injection event group comprises three injection events 1002-1006. The device selects the first injection event 1002, and determines that it is not the last injection event in the injection event group. Therefore, the device then compares the time period between the first injection event 1002 and the second injection event 1004 of 5 seconds to the predetermined time period of 73.5 seconds. Upon determining that the time period of 5 seconds is not greater than the predetermined time period, the device determines that the first injection event 1002 is associated with a priming dose not administered to the user, and the second injection event 1004 is selected. The device determines that second injection event 1004 is not the last injection event and that the time period between the second injection event 1004 and the third injection event 1006 of 3 seconds is not greater than the predetermined threshold of 73.5 seconds. Therefore, the device determines that the second injection event 1004 is associated with a priming dose not administered to the user. The third injection event 1006 is then selected and determined to be the final injection event of the injection event group. Therefore, the device determines that the third injection event is an injection dose administered to the user. The injected dose for the injection event group shown in table 1000 is therefore 4 units.

Referring to table 1030 in FIG. 10B, the injection event group comprises five injection events 1032-1038. The first injection event 1032 is selected and the device determines that it is not the final dose in the injection event group. Therefore, the time period (5 seconds) prior to the second injection event 1034 is compared to the predetermined threshold of 73.5 seconds. Since the time period of the selected injection event is not greater than the threshold, the device determines that the first injection event 1032 is a priming dose not administered to the user. The second injection event 1034 is then selected, and the device determines that it is not the final injection event of the injection event group. The time period between the second injection event 1034 and the third injection event 1036 of 81 seconds is determined to be greater than the predetermined threshold of 73.5 seconds. The device then determines that the time gap rank of 4, associated with the time period between the second and third injection events 1034-1036, is greater than or equal to the predetermined threshold of 3. The device determines that the second injection event is associated with an injection dose administered to the user. The third injection event 1036 is then chosen by the device, which then determines that it is not the final injection event of the injection event group. Since the time period between the third injection event 1036 and the fourth injection event 1038 of 48 seconds is not greater than the 73.5 second threshold, the device determines that the third injection event 1036 is a priming dose that is not administered to the user. Finally, the device determines that the fourth injection event 1038 is associated with an injection dose administered to the user because it is the final injection event of the injection event group. The injected dose for the injection event group shown in table 1030 is therefore 5 units.

Referring to table 1060 in FIG. 10C, the injection event group comprises two injection events 1062 and 1064. The first injection event 1062 is selected by the device, which determines that it is not the final injection event in the injection event group. The time period between the first injection event 1062 and second injection event 1064 (81 seconds) is greater than the predetermined threshold of 73.5 seconds, so the device proceeds to evaluate the time gap rank. The time gap rank of 1, associated with the previously discussed time period, is not greater than or equal to the predetermined threshold of 3. Therefore, the device determines that the first injection event 1062 is a priming dose not administered to the user. The second injection event 1064 is then selected and determined to be an injection dose delivered to the user because it is the final injection event of the injection event group. The injected dose for the injection event group shown in table 1060 is therefore 3 units.

According to some embodiments, a dose determination for an injection event can be made in real-time (e.g., as information for one or more doses is received, rather than generating an injection event group). The device can select a current injection event and compare the dose size to a first predetermined threshold (e.g. a dose size of 8 units, 9 units, 10 units, 11 units, etc.). If the dose size is greater than or equal to the first predetermined threshold, then the device can determine that the current injection event is associated with a dose administered to the user. However, if the dose size is not greater than or equal to the first predetermined threshold, then the device can compare the dose size to a second predetermined threshold. For example, the second predetermined threshold can be a dose size of 3 units, 4 units, 5 units, and/or the like. In the case that the dose size exceeds the second predetermined threshold, then the method can proceed to compare a time period since the last dose to a predetermined time period (e.g. a time of 8 second, 9 seconds, 10 seconds, 11 seconds, etc.). Upon determining that the time period since the last dose is greater than the predetermined time period, the device can determine that the current injection event is associated with an injection dose administered to the user. The device can determine that all other injection events (e.g., if the dose size does not exceed the second predetermined threshold and/or if the time period since the last dose is not greater than the predetermined time period) are priming doses that are not administered to the user.

Figure 11:
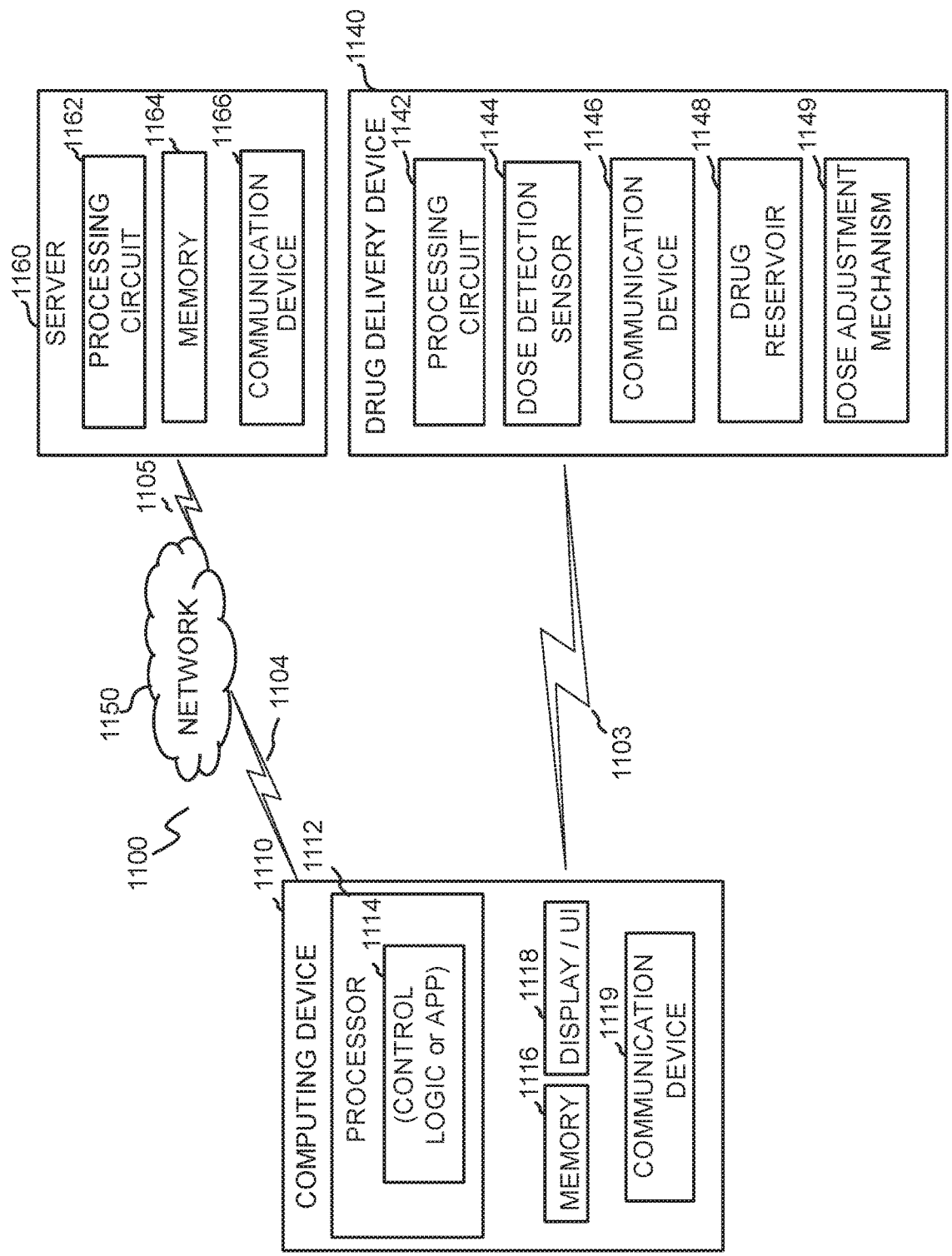
FIG. 11 is a diagram of an exemplary system for implementing the computerized processes described herein, according to some embodiments.

FIG. 11 is a diagram of an exemplary system 1100 for implementing the computerized processes described herein, according to some embodiments. The term "logic," "control logic," "application," "process," "method," "algorithm," and "instructions" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed. System 1100 includes a computing device 1110 in wireless communication with a drug delivery device 1140. Computing device 1110 may also be in communication with a server 1160 via a network 1150.

Computing device 1110 illustratively includes a mobile device, such as a smartphone. Alternatively, any suitable computing device may be used, including but not limited to a laptop, desktop, tablet, or server computer, for example. Computing device 1110 includes processor 1112, memory 1116, display/user-interface (UI) 1118, and communication device 1119.

Processor 1112 includes at least one processor that executes software and/or firmware stored in memory 1116 of computing device 1110. The software/firmware code contains instructions that, when executed by processor 1112, causes processor 1112 to perform the functions described herein. Such instructions illustratively includes control logic/application 1114 operative to implement the functionality described herein. Memory 1114 is any suitable computer readable medium that is accessible by processor 1112. Memory 1114 may be a single storage device or multiple storage devices, may be located internally or externally to processor 1112, and may include both volatile and non-volatile media. Exemplary memory 1114 includes random-access memory (RAM), read-only memory (ROM), electrically erasable programmable ROM (EEPROM), flash memory, a magnetic storage device, optical disk storage, or any other suitable medium which is configured to store data and which is accessible by processor 1112.

Computing device 1110 includes a display/user interface 1118 in communication with processor 1112 and operative to provide user input data to the system and to receive and display data, information, and prompts generated by the system. User interface 1118 includes at least one input device for receiving user input and providing the user input to the system. In the illustrated embodiment, user interface 1118 is a graphical user interface (GUI) including a touchscreen display operative to display data and receive user inputs. The touchscreen display allows the user to interact with presented information, menus, buttons, and other data to receive information from the system and to provide user input into the system. Alternatively, a keyboard, keypad, microphone, mouse pointer, or other suitable user input device may be provided.

Computing device 1110 further includes communication device 1119 that allows computing device 1110 to establish wired or wireless communication links with other devices. Communication device 1119 may comprise one or more wireless antennas and/or signal processing circuits for sending and receiving wireless communications, and/or one or more ports for receiving physical wires for sending and receiving data. Using communication device 1119, computing device 1110 may establish one or more short-range communication links, including communication link 1103 with drug delivery device 1140. Such short-range communication links may utilize any known wired or wireless communication technology or protocol, including without limitation radio frequency communications (e.g., Wi-Fi; Bluetooth, Bluetooth Low Energy (BLE), Near Field Communications (NFC), RFID, and the like), infrared transmissions, microwave transmissions, and lightwave transmissions. Such short-range communication links may be either uni-directional links (e.g., data flows solely from device 1140 to computing device 1110), or bi-directional links (e.g., data flows both ways). Communication device 1119 may also allow computing device 1110 to establish a long-range communication link with a server 1160 via a network 1150, and communication links 1104 and 1105. The server 1160 may be located remote from computing device 1110, e.g., in another building, in another city, or even in another country or continent. Network 1150 may comprise any cellular or data network adapted to relay information from computing device 1110 to and/or from server 1160, potentially via one or more intermediate nodes or switches. Examples of suitable networks 1150 include a cellular network, a metropolitan area network (MAN), a wide area network (WAN), and the Internet.

Drug delivery device 1140 illustratively includes any device configured to deliver one or more dose(s) of medication to a patient, to measure and/or record the time and amount of each dose, and to communicate this information to computing device 1110. In some embodiments, the drug delivery device 1140 can be configured to store and/or deliver one or more dose(s) of medication to a person. As used herein, the term "medication" or "drug" may refer to insulin, insulin analogs such as insulin lispro or insulin glargine, and/or insulin derivatives, but may also refer to one or more other therapeutic agents including but not limited to GLP-1 receptor agonists such as dulaglutide or liraglutide, glucagon, glucagon analogs, glucagon derivatives, gastric inhibitory polypeptide (GIP), GIP analogs, GIP derivatives, oxyntomodulin analogs, oxyntomodulin derivatives, therapeutic antibodies and any therapeutic agent that is capable of delivery by the above device. The medication as used in the device may be formulated with one or more excipients. The device is operated by a patient, caregiver or healthcare professional to deliver drug to a person. Drug delivery device 1140 may be configured as a re-usable device that may be re-filled with medication once its store of medication is exhausted, or may be configured as a disposable device that is designed to be discarded and replaced once its store of medication is exhausted. Drug delivery device 1140 includes processing circuit 1142, dose detection sensor 1144, communication device 1146, drug reservoir 1148 and dose adjustment mechanism 1149. Processing circuit 1142 may include any of the possible types of processing circuits previously described. Dose detection sensor 1144 may include any suitable sensor for detecting and/or recording the time and amount of dose delivered. Communication device 1146 allows drug delivery device 1140 to communicate with computing device 1110 via communication link 1103. Drug reservoir 1148 may be sized sufficiently to hold enough medication for a plurality of doses, while dose adjustment mechanism 1149 allows a user to adjust a dose amount for an injection of the drug delivery device.

Server 1160 illustratively includes any computing device configured to receive information regarding patients from computing device 1110 via network 1150, process said information, and optionally, to send responses, notifications, or instructions to computing device 1110 in response to said information. Server 1160 includes processing circuit 1162, memory 1164, and communication device 1166. Processing circuit 1162 may include any of the possible types of processing circuits previously described. Processing circuit 1162 may execute software and/or firmware stored in memory 1164 of server 1160. The software/firmware code contains instructions that, when executed by processing circuit 1162 to perform the functions described herein. Memory 1164 may also be configured to store information regarding one or more patients, such as biographical information and/or medical information (e.g., medication dosing records, medical history, and the like). Information received from or sent to computing device 1110 may also be stored in memory 1164. Memory 1164 may include any of the possible types of memory previously described. Communication device 1166 allows server 1160 to communicate with computing device 1110 via communication link 1105, network 1150, and communication link 1104.

In some embodiments, computing device 1110 may operate without being connected to any network 1150 and/or server 1160.

In other embodiments, system 1100 may be modified by adding components. For example, server 1160 may be configured as a plurality of networked servers 1160 that cooperate to process information. Such a configuration of networked servers may be referred to as a "cloud" of servers that perform the functions described herein. The server(s) 1160 may communicate with multiple computing devices 1110 via network 1150, and each computing device 1110 may in turn be optionally connected with one or more drug delivery devices 1140.

In some embodiments, the techniques described herein can be used with reusable medication devices, such as reusable insulin pens, including for reusable insulin pens that report cartridge change events. In some embodiments, reusable medication delivery devices can generate data indicative of cartridge change times as described herein, which can be used to process injection data based on reservoir changes.

In some embodiments, some or all of the techniques described herein (e.g., processes 200, 400, 450, 700, and/or 900) can be executed by the medication delivery device. For example, the medication delivery device can include processing circuitry configured to determine the injection event groups and/or to determine the injected dose (e.g., by distinguishing priming and injection events, including appropriately handling cartridge changes). In some embodiments, the medication delivery device can be configured to transmit determined information (e.g., injection event groups and/or injection doses) to a separate device, such as a smartphone or a module that can be attached to the medication delivery device.

In some embodiments, some or all of the techniques described herein (e.g., processes 200, 400, 450, 700, and/or 900) can be executed by a separate device from the medication delivery device, such as by an application running on a smartphone or other device that can be communicably coupled to the medication delivery device (e.g., computing device 1110), a remote server (e.g., server 1160), and/or the like. The medication delivery device can be configured to transmit injection data and/or processed data, such as injection event groups and/or device change information to the separate device. In some embodiments, the medication delivery device can be a disposable medication delivery device. Some illustrative examples of such disposable medication delivery are described in further detail in International Pub. No. WO 2019/040313, entitled MEDICATION DELIVERY DEVICE WITH SENSING SYSTEM and having an international filing date of Aug. 14, 2018, the contents of which are incorporated herein in its entirety.

In some embodiments, the medication delivery device may not include wireless transmission functionality, dose detection functionality, and/or processing functionality. In some embodiments, a reusable electronic module can be attached/detached from a medication delivery device to add one or more such features to the medication delivery device. For example, the reusable electronic module can be configured to sense the amount of a dose associated with each injection event, and report the information to a second device that processes the injection event data. Some illustrative examples of such a reusable electronic module are described in further detail in International Pub. No. WO 2018/160425, entitled DOSE DETECTION AND DRUG IDENTIFICATION FOR A MEDICATION DELIVERY DEVICE and having an international filing date of Feb. 22, 2018, the contents of which are incorporated herein in its entirety. As another example, the reusable electronic module can be configured to report information when the device is attached to and/or removed from a medication delivery device, which the receiving device can use to determine change information.

In some embodiments, processes 200, 400, 450, 700, and/or 900 described above may be refined based on user feedback. As discussed above, processes 200, 400, 450, 700, and/or 900 may classify each received injection event as being associated with a dose administered to a user or as a priming dose that is not administered to the user. In some embodiments, the user may manually provide feedback that indicates whether the classification applied to specific injection events by processes 200, 400, 450, 700, and/or 900 are correct. For instance, the user may confirm that a specific injection event was correctly classified as an administered dose vs. a priming dose, or the user may modify and/or correct the label applied by processes 200, 400, 450, 700, and/or 900. As the user provides feedback either confirming or correcting the classifications output by processes 200, 400, 450, 700, and/or 900, this feedback may be used to modify said processes to classify future injection events more accurately. For instance, once sufficient user feedback has been collected over a specified time period (e.g., a few days, one week, a few weeks, or a month), the user feedback may be used to train a machine learning model that adjusts the thresholds or timers in said processes to increase the accuracy of said processes. The user feedback used to train the machine learning model may be derived from a single user, or from a population of users. A non-limiting set of thresholds and/or timers that may be adjusted by such a machine learning model may include (i) the duration of the injection event window in step 206, (ii) the first threshold referenced in step 704, (iii) the duration of the second threshold referenced in step 710, (iv) the size of the third threshold referenced in step 714, (v) the first predetermined threshold referenced in step 908, and/or (vi) the second predetermined threshold referenced in step 912. The machine learning model and/or the adjustments of said thresholds and/or timers may be implemented on computing device 1110, but may also be implemented on drug delivery device 1140 and/or server 1160. By continuously learning from user feedback, such a machine learning model could continuously refine and improve the accuracy of processes 200, 400, 450, 700, and/or 900.

While adjusting thresholds and/or timers in said processes alters certain programmable features in such processes, the data flow in such processes remains essentially the same. In some embodiments, however, in addition to adjusting thresholds and/or timers in certain process steps, such user feedback may also be used to modify processes 200, 400, 450, 700, and/or 900 by adding, deleting, rearranging, and/or editing any of said processes' steps. For example, such user feedback may be used to derive new data features (e.g., in addition to data features such as dose size, time between doses, order of doses, and/or time gap rank of doses described above), and to incorporate such new data features into an entirely new process. Such user feedback may also be used to prompt a switch from one of the aforementioned processes 200, 400, 450, 700, and/or 900 to another of the aforementioned processes.

A machine learning model capable of making these more extensive adjustments to processes may require a higher amount of training data, computational resources, and/or memory than a model that simply makes adjustments to thresholds and/or timers. Some embodiments, therefore, may employ a two-level model for adjusting processes. A first, simpler machine learning model may be used to adjust thresholds and/or timers. This simpler machine learning model may be implemented relatively frequently (e.g., weekly) and on a device having relatively modest computational resources and/or memory (e.g., computing device 1110). The set of user feedback used to train such a model may also be derived from just one single user, or from a smaller population of users. A second, more complex machine learning model may be used to implement the aforementioned more extensive modifications to processes 200, 400, 450, 700, and/or 900. This more complex machine learning model may be implemented relatively less frequently (e.g., monthly), using a larger amount of training data (e.g., from a larger population of users), and/or on a device having a greater amount of computational resources and/or memory (e.g., server 1160). Once this second machine learning model outputs a revised process, this revised process may be distributed to one or more computing devices 1110 and/or drug delivery devices 1140 to classify further injection events.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method for treating diabetes in a patient in need thereof, the method comprising:
   accessing data indicative of an injection event group comprising one or more injection events associated with one or more medication delivery devices, wherein each of the one or more medication delivery devices comprises:
      a dose adjustment mechanism that allows a user to adjust a dose amount for an injection of insulin of the medication delivery device;
      a reservoir sized sufficiently to hold medication for a plurality of doses of insulin;
      one or more sensors to detect an amount of dose dispensed for each injection; and
      a wireless communication unit that communicates amount of dose dispensed and time dispensed;
   determining whether the injection event group is associated with a medication delivery device change;
   upon determining the injection event group is not associated with the medication delivery device change, analyzing the injection event group based on a first dose detection algorithm to determine a dose administered to a user;
   upon determining the injection event group is associated with the medication delivery device change, analyzing the injection event group based on a second dose detection algorithm to determine the dose administered to the user, wherein the second dose detection algorithm comprises, upon determining that a change time associated with the medication delivery device is later than a time associated with at least one injection event in the injection event group and earlier than another time associated with at least one other injection event in the injection event group:
 determining a first sub-injection event group comprising each injection event in the injection event group associated with a time that occurred before the change time,
 determining a first latest injection event in the first sub-injection event group, wherein the first latest injection event occurred later in time than any other injection event in the first sub-injection event group;
 determining a second sub-injection event group comprising each injection event in the injection event group associated with a time that occurred after the change time,
 determining a second latest injection event in the second sub-injection event group, wherein the second latest injection event occurred later in time than any other injection event in the second sub-injection event group; and
 determining the dose based on a sum of the first latest injection event in the first sub-injection event group and the second latest injection event in the second sub-injection event group, wherein any remaining injection events in the first sub-injection event group and any remaining injection events in the second sub-injection event group are designated priming injection events;
calculating an amount of insulin-on-board based on the determined dose; and
calculating and administering a bolus of insulin based on the calculated amount of insulin-on-board.

2. The method of claim 1, wherein:
the one or more medication delivery devices comprises a previous medication delivery device and a new medication delivery device; and
determining whether the injection event group is associated with the medication delivery device change comprises determining whether the user switched from using the previous medication delivery device to using the new medication delivery device within a predetermined time window of the injection event group.

3. The method of claim 1, wherein:
the one or more medication delivery devices comprises one medication delivery device; and
determining whether the injection event group is associated with the medication delivery device change comprises determining whether there is a change of a replaceable medication cartridge of the one medication delivery device within a predetermined time window of the injection event group.

4. The method of claim 1, wherein analyzing the injection event group based on the first dose detection algorithm comprises:
 determining a number of injection events in the injection event group is greater than two; and
 determining the dose is equal to an injected amount associated with a latest injection event of the injection event group, wherein the latest injection event occurred later in time than any other injection event in the injection event group.

5. The method of claim 4, wherein the latest injection event is designated a true injection event, and all other injection events in the injection event group are each designated priming injection events.

6. The method of claim 1, wherein analyzing the injection event group based on the first dose detection algorithm comprises:
 determining a number of injection events in the injection event group is equal to two, wherein the injection event group comprises:
  a first injection event associated with a first time; and
  a second injection event associated with a second time that is later than the first time; and
 determining whether a first injection amount associated with the first injection event is greater than a second injection amount associated with the second injection event.

7. The method of claim 6, further comprising, upon determining the first injection event is greater than the second injection event, determining the dose based on a sum of the first injection amount and the second injection amount.

8. The method of claim 6, further comprising, upon determining the first injection event is not greater than the second injection event, determining the dose is equal to the second injection amount.

9. The method of claim 8, wherein the first injection event is designated a priming injection event.

10. The method of claim 1, wherein analyzing the injection event group based on the second dose detection algorithm comprises determining whether a change time associated with the medication delivery device change is (i) later than each time associated with each injection event in the injection event group or earlier than each time associated with each injection event in the injection event group, or (ii) later than a time associated with at least one injection event in the injection event group and earlier than another time associated with at least one other injection event in the injection event group.

11. The method of claim 10, further comprising, upon determining the change time is later than each time associated with each injection event in the injection event group, determining the dose is equal to an injected amount associated with a latest injection event of the injection event group, wherein the latest injection event occurred later in time than any other injection event in the injection event group.

12. The method of claim 11, wherein remaining injection events are designated priming injection events.

13. The method of claim 1, further comprising determining the injection event group.

14. The method of claim 13, wherein:
 determining the injection event group comprises determining the plurality of injection events meet a predetermined criterion; and
 determining the plurality of injection events meet a predetermined criterion comprises determining, for each injection event of the plurality of injection events, a time associated with the injection event is within a predetermined time period of a previous injection event in the plurality of injection events.

* * * * *